United States Patent [19]
Calder et al.

[11] Patent Number: 5,963,972
[45] Date of Patent: Oct. 5, 1999

[54] MEMORY ARCHITECTURE DEPENDENT PROGRAM MAPPING

[75] Inventors: Bradley Gene Calder, Palo Alto, Calif.; Amir Hooshang Hashemi, Brighton; David Richard Kaeli, Medway, both of Mass.

[73] Assignee: Digital Equipment Corporation, Maynard, Mass.

[21] Appl. No.: 08/806,891

[22] Filed: Feb. 24, 1997

[51] Int. Cl.$^6$ .................................................. G06F 12/00
[52] U.S. Cl. ........................... 711/129; 711/118; 711/133; 711/158
[58] Field of Search .................................... 711/129, 133, 711/158, 118; 395/581, 800.1, 495

[56] References Cited

U.S. PATENT DOCUMENTS

| | | | |
|---|---|---|---|
| 5,450,564 | 9/1995 | Hassler et al. | 395/495 |
| 5,539,907 | 7/1996 | Srivastava et al. | |
| 5,737,750 | 4/1998 | Kumar et al. | 711/129 |
| 5,737,752 | 4/1998 | Hilditch | 711/133 |

OTHER PUBLICATIONS

Pettis et al., Profile Guided Code Positioning, 1990.
Scott Mcfarling, Program optimization for Instruction Caches, 1989.
McFarling, Scott; Computer Systems Laboratory, Stanford University, 1989; Program Optimization for Instruction Caches, pp. 183–191.
Pettis, Karl and Hansen, Robert C.; Hewlett–Packard Co., California Language Laboratory, 1990; Profile Guided Code Positioning, pp. 16–27.
Hwu, Wen–mel W. And Chang, Pohua P.; Coordinated Science Laboratory, Unversity of Illinois, 1989; Achieving HIgh Instruction Cache Performance With An Optimizing Compiler; pp. 242–251.
Torrellas, Josep and Xia, Chun and Daigle, Russell; Center for Supercomputing Research and Development; Optimizing Instruction Cache Performance for Operating System Intensive Workloads.
Hashemi, Amir H. And Kaeli, David R. and Calder, Brad; WRL Research Report 96/3, Oct. 1996; Efficient Procedure Mapping using Cache Line Coloring.

*Primary Examiner*—John W. Cabeca
*Assistant Examiner*—Nasser Moazzami
*Attorney, Agent, or Firm*—Jenkens & Gilchrist, a Professional Corporation

[57] ABSTRACT

In a computer implemented method, instructions of a program are mapped into a cache memory of a computer system. The cache memory is partitioned into a plurality fixed size lines for the convenience of accessing the instructions. Each block is assigned a different identification, for example a unique color. The program is partitioned into a plurality of instruction units, for example procedures or basic blocks. A flow graph is generated for the program. In the graph, nodes represent the instructions units, and edges directly connect nodes that have an execution relationship. Instruction units of directly connected nodes are mapped into blocks having different identifications or colors. An unavailable-set of identifications is maintained for each node. The unavailability-set of a particular node includes the identifications of blocks mapping instruction units directly connected to the particular node and which should not be used for the particular procedure in order to minimize cache conflicts during execution of the program.

15 Claims, 9 Drawing Sheets

MEMORY ARCHITECTURE DEPENDENT PROGRAM MAPPING

FIELD OF THE INVENTION

This invention relates generally to optimizing programs, and more particularly to mapping instructions of programs into a cache memory.

BACKGROUND OF THE INVENTION

The increasing gap between processor and main memory speeds has forced computer designers to exploit cache memories. A cache memory is usually smaller than the main memory, and, if properly managed, can hold a major part of the working set of a program. The working set being the instructions of the program that are immediately being executed.

The goal of memory subsystem designers is to improve the average memory access time. Reducing the cache miss rate is one factor for improving memory access performance. Cache misses occur for a number of reasons: cold start, lack of capacity, and collisions. A number of cache line replacement algorithms have been proposed to reduce the number of cache misses.

Some prior art methods have concentrated on the layout of the instructions of the program onto the addresses of the cache memory. For example, a dynamic remapping of cache addresses has been suggested to avoid conflicts in large direct-mapped caches. In an alternative approach, instructions are repositioned at compile or link-time. There, the idea is to place frequently executed portions of the program at adjacent addresses of the cache memory. Thus, the chances of cache conflicts are reduced while increasing spatial locality within the program.

Code reordering algorithms for improved memory performance can span several different levels of granularity, from basic blocks, to loops, procedures, and entire programs. It is desired to reorder instructions of programs to significantly improve a program's execution performance.

SUMMARY OF THE INVENTION

The invention provides a computer implemented method for mapping instructions of a program into a cache memory of a computer system so that cache conflicts are minimized. During mapping, instructions of the program may be reordered to improve spatial locality.

First, the lines of a direct mapped cache or the sets of a set-associative cache, e.g., "blocks" or "chunks," are each assigned different identifications, for example, different colors.

The program is partitioned into a plurality of instruction units, for example, basic blocks or procedures. A flow graph is generated for the program. In the flow graph, each node represents a different instruction unit, and an edge connecting two nodes indicates that the nodes have an execution relationship, for example a procedure call. Instruction units of directly connected nodes are mapped into blocks having different identifications in order to minimize cache conflicts.

Associated with each node is an unavailable-set. The unavailability-set of a particular node includes the identifications (colors) of blocks mapping instruction units corresponding to nodes directly connected to the particular node. A weight is assigned to each edge. The weight is proportional to a relative importance of the execution relationship between the two nodes directly connected by the edge, for example, how frequently the edge is traversed during execution.

The instruction units are mapped in an order according to the weights of the edges. Additionally, the instruction units are partitioned into popular and unpopular sets. Instruction units of the popular set are mapped before the instruction units of the unpopular set. The instruction units of the unpopular set are used to fill memory spaces generated during the mapping of popular instruction sets.

DETAILED DESCRIPTION OF PREFERRED EMBODIMENTS

Overview

Figure 1:
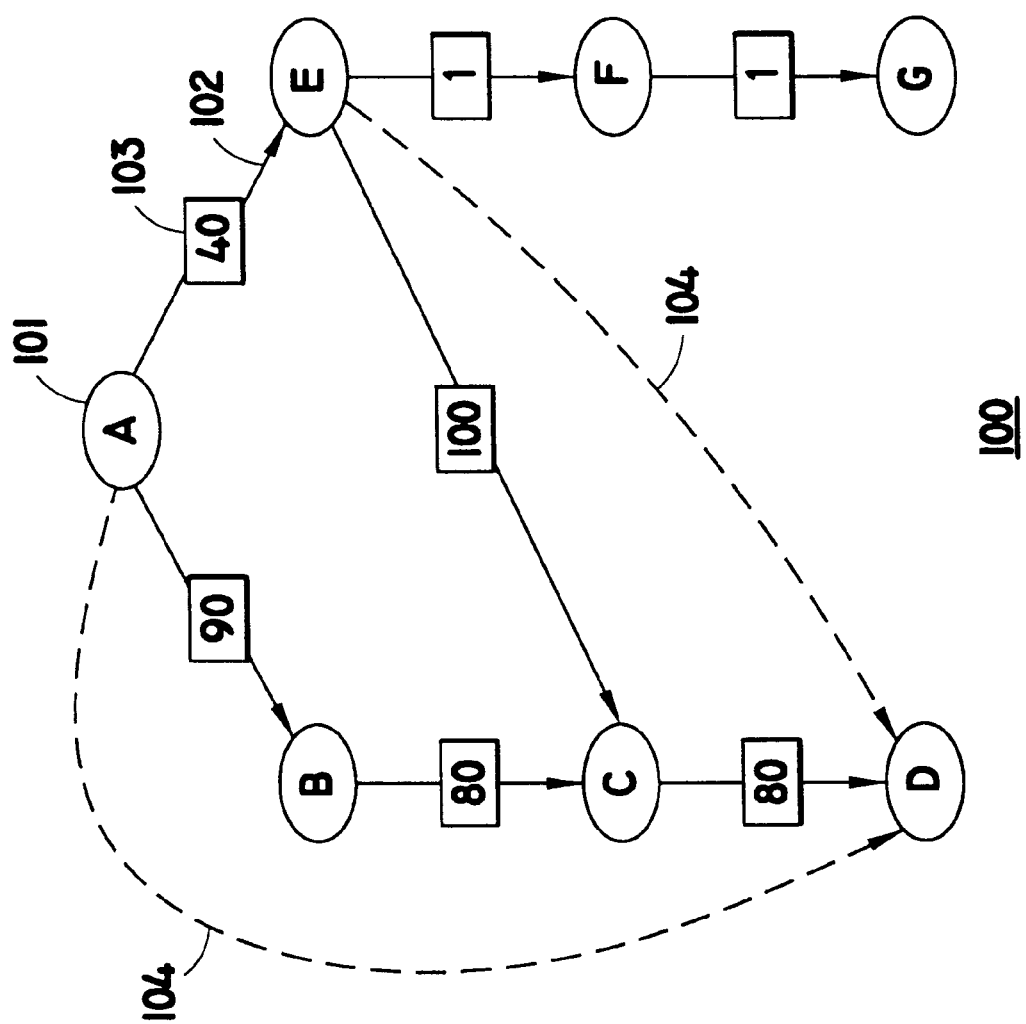
FIG. 1 is a control flow graph of instruction units of a program.

We first generally describe our method for mapping machine executable instructions of programs onto addresses of a direct mapped cache. Then, we will also describe how the method can be applied to set-associative caches. Mapping in the context of this description means that the instructions of the program are reordered. The reordered instructions, when loaded into a memory for execution, have an improved spatial locality so that cache misses are minimized.

The basic idea behind our method is to treat cache memory addresses as a two dimensional space by partitioning the addresses space into portions that are equivalent to the size of the cache, and using the cache lines occupied by units of instructions, for example procedures or basic blocks, to guide the mapping.

In contrast, previous mapping schemes typically treat memory layout as a one dimensional address space. Employing a second dimension allows our method to intelligently avoid cache conflicts when mapping a unit of instructions for the first time. Furthermore, the method provides the ability to move instructions that have already been mapped to other addresses in order to eliminate cache conflicts as they may arise due to mapping additional instruction units.

Instruction units can be basic blocks, procedures, routines, or program sections. In the following description of a preferred embodiment, the units of instructions are procedures. However, it should be understood that the units of instructions can be any groups of instructions related by their execution flow.

In order to avoid cache conflicts, we use the concept of "coloring" the cache lines and the units of instructions. As defined herein, colors are arbitrary identifications which can be associated with cache lines and units of instructions. There can be one unique color for each line of the cache.

For example, when a procedure is mapped to one or more lines, the procedure assumes the color or colors of the lines that the procedure is mapped to. In addition, for each procedure, there is a set which indicates which colored cache lines are currently unavailable for that unit of instructions. We will refer to this set of colors as the unavailable-set For a particular procedure, the unavailable-set of colors identifies the colors occupied, i.e., cache lines used, by all of the immediate parent and child procedures of that particular procedure. A parent procedure calls the particular procedure, and a child procedure is called by the particular procedure. These procedures are sometimes called "first generation" procedures. The calling relationship of procedures can be determined from a program flow graph which can indicate the colors of procedures which have been mapped.

In the preferred embodiment, we use a flow graph with weighted edges for indicating the importance of mapping procedures next to each other. For example, the weight is proportional to the number of times the edge is traversed during execution of the program. Other weightings for other execution relationships can also be used. Our method concentrates on eliminating first-generation cache conflicts. First generation conflicts are those conflicts which exist between a particular procedure and the immediate parent and child procedures of that procedure.

Although the preferred embodiment is described with respect to conflicts between units of instructions which have a first generation relationship, it should be understood that the general method can also be used for any units of instructions which have an execution relationship.

When mapping a procedure, our method tries to minimize cache misses by avoiding mapping procedures in cache lines "colored" with the colors of the procedure's unavailable-set. Once a procedure has been mapped, the procedure can later be moved to new addresses without causing cache conflicts, as long as the procedure is not moved to addresses that have colors that are members of the procedure's unavailable-set.

In using color mapping to place and move procedures in this way, we can ensure that the new location of a procedure will not increase the number of conflicts for the units of instructions of our example flow graph 100.

It is well known that for a typical program about ten to thirty percent of the instructions account for about ninety percent of the execution time. Often, the remainder of the instructions are executed occasionally, or almost never, for example, the instructions which handle rarely occurring unanticipated execution flows.

Our method takes advantage of the above property by dividing each program into frequently executed (popular), and infrequently executed (unpopular) units of instructions, for example, basic blocks or procedures. The unpopular units can be used to fill the empty space left behind by procedures which are moved by our method. We will not worry about conflicts when positioning unpopular procedures, since these parts of a program do not significantly contribute to the number of first level cache conflicts.
Cache Coloring As shown in FIG. 1, a control flow graph 100 represents a program to be mapped. The graph 100 includes a plurality of nodes 101 (circles A–G) connected to each other by edges (directed arcs) 102. Each node represents one of the units of instructions of the program. The edges represent execution relationships between any two nodes, for example, procedure calls.

Associated with each edge is a weight 103. The weight is proportional to the relative importance of the execution relationship between the units represented by the nodes directly connected by the edge. For example, the weights indicate the relative number of times that the procedures A–G are called. By convention, a particular procedure is called by a "parent" procedure, and the particular procedure calls a "child" procedure. The parent and child procedures are designated first generation procedures. The graph 100 can be amplified with additional edges 104 which indicate other significant execution relationships that can be determined empirically from, for example, an execution profile or trace.

Table 1 indicates the relative sizes of the units A–G expressed as the number of cache lines required to store the units. The size of a cache line is usually implementation specific, for example 64 bytes.

TABLE 1

| Procedure | A | B | C | D | E | F | G |
|---|---|---|---|---|---|---|---|
| Size | 1 | 1 | 2 | 2 | 2 | 1 | 2 |

Figure 2:
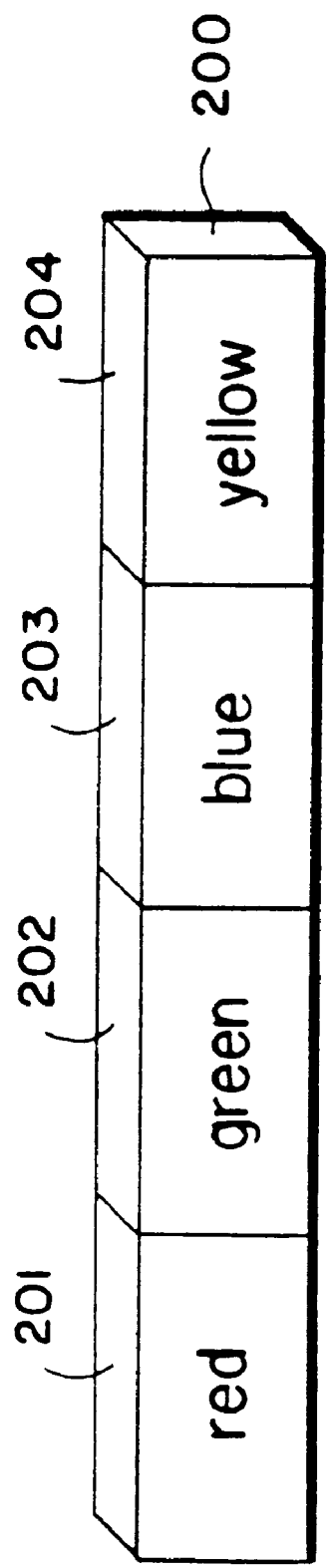
FIG. 2 is a block diagram of an instruction cache memory used to store the instructions of the program of FIG. 1.

FIG. 2 shows an exemplary cache 200 into which the units A–G of FIG. 1 are mapped. In one embodiment, the cache 200 is a direct mapped instruction cache. Instruction caches are usually small and coresident with the processor on the same semiconductor die. Because of the small size of an instruction cache, cache conflicts can be a major factor in reducing the performance of the system.

However, it should be understood that our method can also be used for larger off-chip caches, or even for a "paged main memory, where pages of a much larger, for example 4K bytes address spaces, are mapped in and out.

The cache 200 is partitioned into a plurality of access blocks. An access block is the unit of addresses which are used to read and write data of the cache. For example, the cache 200 includes four lines 201–204, and each line can include, for example, 64 bytes. This means that instructions are accessed as 64 byte units.

Each line of the cache is associated with a different unique arbitrary identification. For our purposes, we refer to these identifications as "colors." For example, the colors of the cache lines 201–204 are respectively red, green, blue, and yellow (r, g, b, y). A larger cache may have many more colors, one for each unit of transfer, e.g., line, block, or page.

Figure 3A:
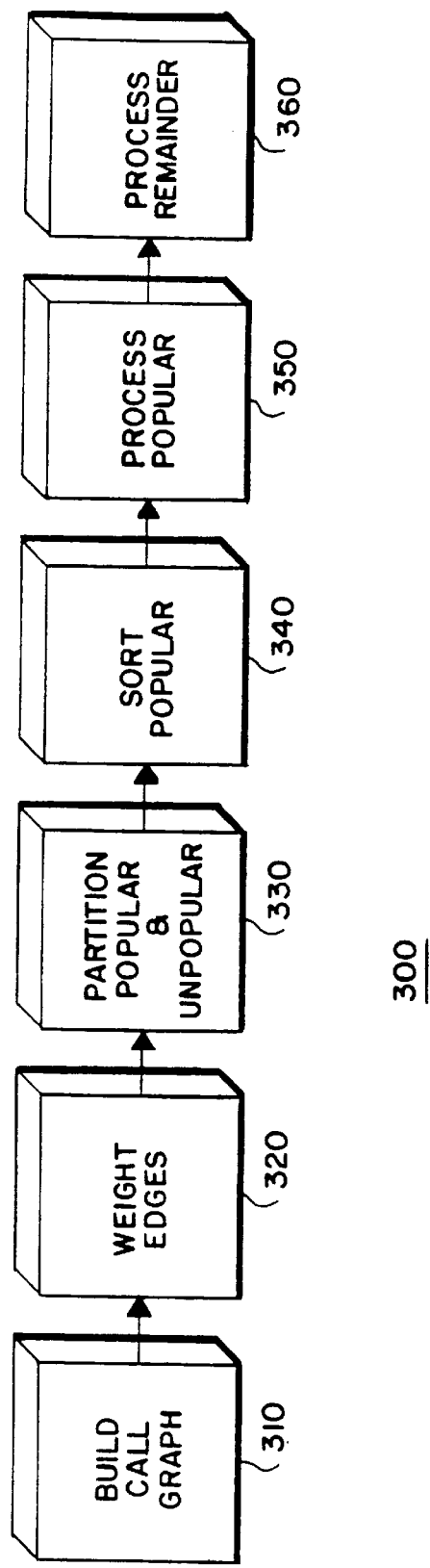
FIGS. 3a and 3b are flow diagrams illustrating steps of a process to map the instructions into the cache of FIG. 2.

FIG. 3a shows a method 300 according to our invention. The substeps of the method 300 are described in further detail below. An example process for building the flow graph 100 is described in U.S. Pat. No. 5,539,907, "System for Monitoring Computer System Performance," issued to Srivastava et al. on Jul. 23, 1996.

In step 310, the flow graph is constructed for the program which is to be optimized. In step 320, the weights 103 of the edges 102 are determined. Step 330 partitions the instruction units and edges into popular and unpopular units and edges based on the weight of the edges connecting the units. The partitioning can be based on some threshold value.

The popular units are sorted according to their weights in step 340. In step 350, the units are mapped in decreasing order of their weights, for example, the most frequently executed popular procedure first and the least frequently executed popular procedure last. In the final step 360, the remaining instruction units are mapped.

Figure 3B:
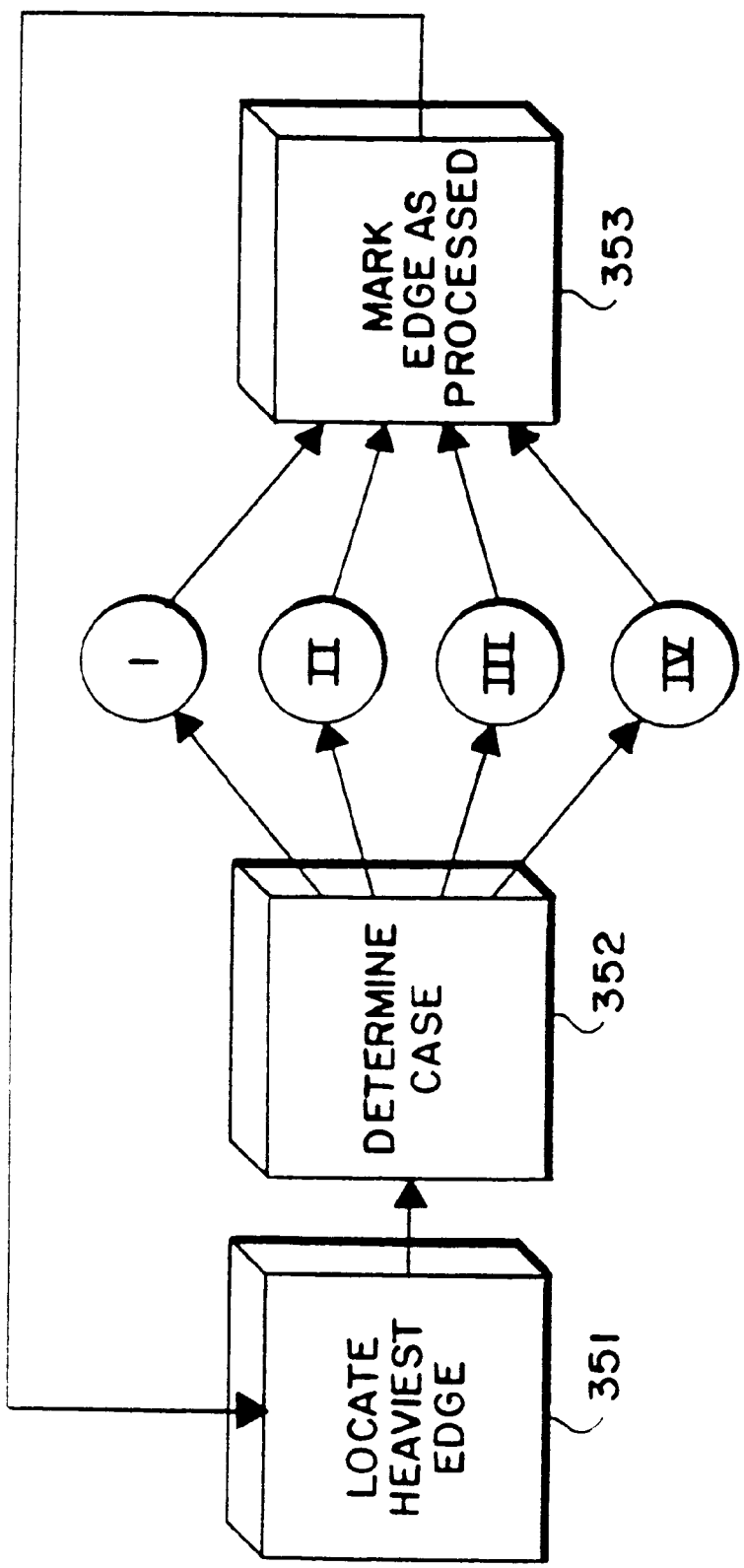

FIG. 3b shows the sub-steps of step 350 in greater detail. In step 351 the current heaviest edge is located. Step 352 determines which case (I, II, III, or IV see below) applies to the units connected by the edge. The cases are processed accordingly, see below. In step 353, mark the edge as processed, and repeat beginning with step 351 until all edges are processed.

Figure 4:
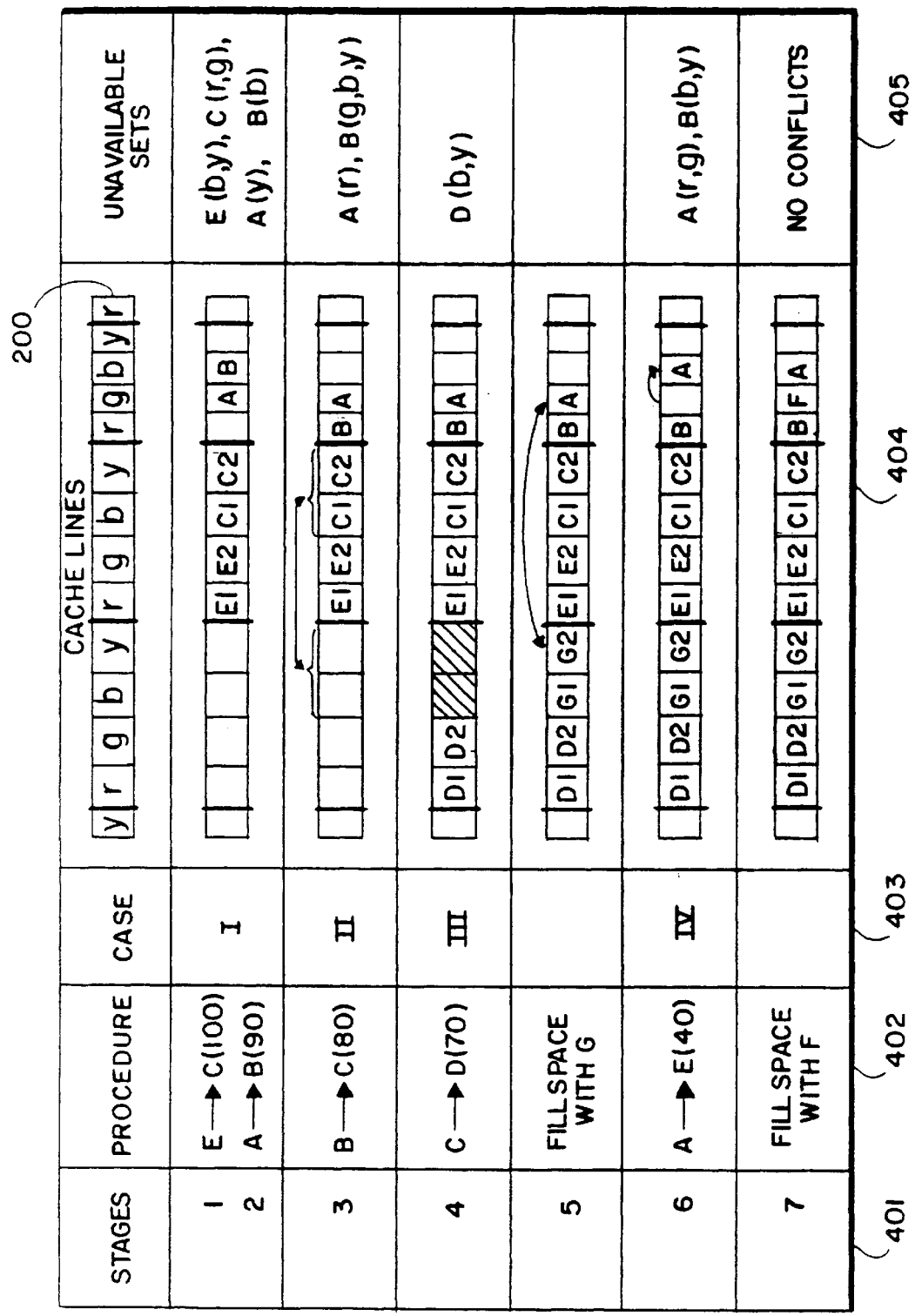
FIG. 4 is a chart of stages and states maintained by the processing steps of FIG. 3a and 3b.

FIG. 4 shows a chart 400 of stages and states of our method for mapping the instruction units A–G of the example flow graph 100 into the cache 200 according to the preferred embodiment. The first column 401 indicates the individual stages 1 though 7. The second column 402 indicates the procedures and edges (with associated weights). The third column 403 indicates which of four processing cases (I, II, III, and IV) is applied to the procedures and edges to perform the mapping.

The fourth column 404 shows the address space for instances of a four line cache, and how the procedures of the graph 100 are mapped to the lines using the sizes as indicated in Table 1. The order of the colors of the lines for the instances of the cache shown in column 404 are as shown in FIG. 2.

The fifth column 405 indicates the unavailable-sets for the mapped units. The color members of the unavailable-sets can change as units are remapped to avoid cache conflicts. If a unit spans more than one line, as do procedures C, D and G, then multiple mapping elements are generated, for example elements C1, and C2.

Our method maintains three pieces of state information for each unit of instructions:

the number of cache lines (different colors) required to store the unit, the colors used to map the unit, and the unavailable-set for the unit; i.e., the colors to be avoided.

In the preferred embodiment, the unavailable-sets are not actually stored, instead each instruction unit (node) has a pointer to its parent and child unit. The unavailable-set can be generated as needed by performing a logical union of all the colors of the parent and child unit. However, this union is only performed if the edges connecting the units have already been processed.

Each unit of instructions is represented by a node 101 in the flow graph 101, and each edge 102 represents an execution relationship, for example, a procedure call. Multiple calls from a procedure to a child procedure are represented by a single edge in the graph. The weights 103 of the edges 102 represent the number of times each edge is traversed. The sum of the weights of the edges entering and exiting a node indicate the number of incoming and outgoing calls, and therefore the relative "popularity" of an instruction unit. Other weighing heuristics can also be used.

After the flow graph 100 has been built, the popularity of each unit is considered. Based on the popularity, the flow graph 100 is partitioned into popular and unpopular sets of units and edges. The popular instruction unit set includes as members all units which are frequently a caller or callee, and the popular edge set includes frequently traversed edges. All other instruction units and edges are assigned to unpopular sets.

Note, there is a difference between popular units of instructions, and units that consume a substantial amount of execution time. For example, a time consuming procedure may be labelled unpopular because it is rarely invoked, or it rarely calls another procedure. If a particular procedure does not redirect the execution flow, then there is very little need to eliminate cache conflicts between the procedure, and the rest of the procedures of the flow graph.

In the example flow graph 100 of FIG. 1, the popular procedures are procedures A, B, C, D, and E, and the unpopular procedures are F and G, since the later are rarely called. The popular edges are A→B, B→C, C→D, A→E, and E→C, the unpopular edges are E→F, and F→G. The method sorts the popular edges in a descending order using the edge weights. The unpopular units are sorted in an increasing order according to their sizes. The unpopular units are used to fill spaces resulting from the remapping of units.

After determining the relative popularity of the procedures and edges, our method processes all of the popular edges beginning with the most frequently traversed edges, and ending with the least frequently traversed edges. There are four possible cases when processing an edge according to our method.

The first case occurs when an edge connects two units that have not yet been mapped, for example, procedures E and C in the first stage of mapping. In case I, the two procedures are merged to generate a "compound" node. The two procedures are placed next to each other in the cache, and assigned cache line colors starting at some arbitrary color. For example, procedure E is mapped into the red and green lines, and procedure C is mapped into the blue and yellow lines.

Each procedure is assigned cache line colors equal to a number which is determined by dividing the procedure size by the size of the cache lines. After the colors have been assigned to units, the unavailable-set for each unit includes the colors (cache lines) used by the parent and child procedures at the other ends of the edges of the mapped unit When processing an edge, the remaining three cases are instances where:

the edge directly connects two units in two different compound nodes, the edge is between an unprocessed unit and a unit in a compound node, and the edge being processed is a call between two units in the same compound node.

We now describe the processing of the four cases in greater detail.

Case I

Figure 5:
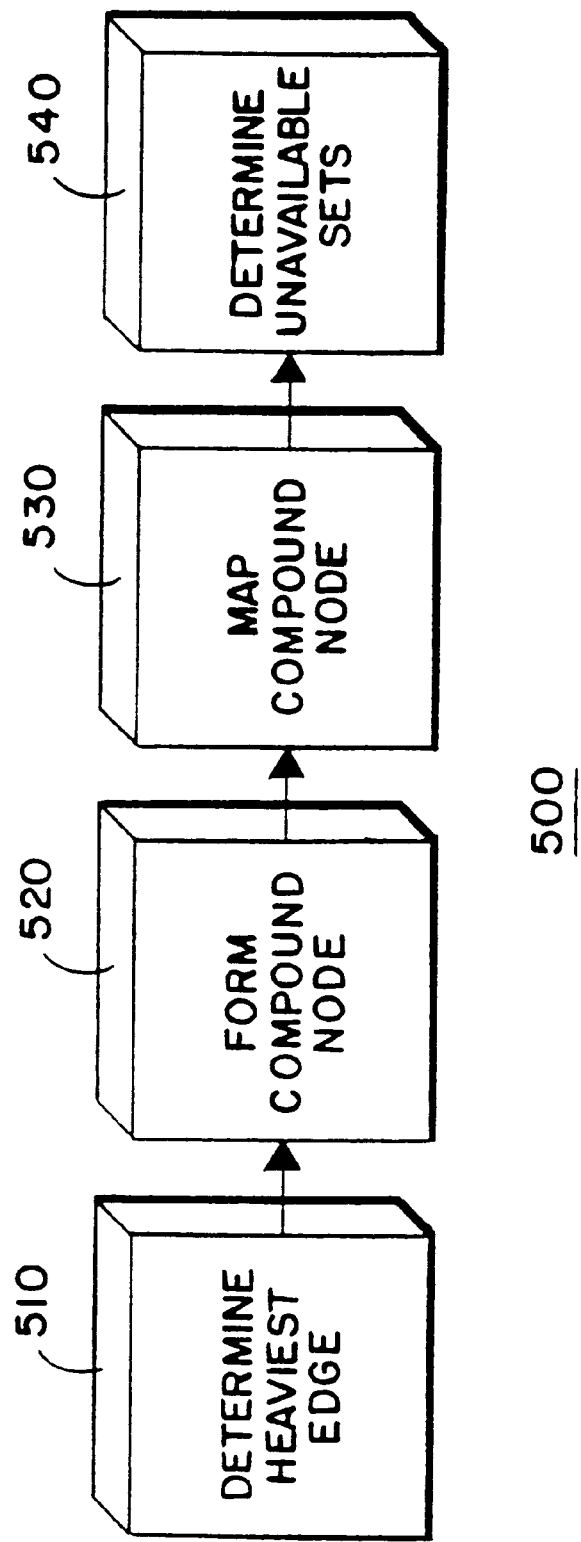
FIG. 5 is a block diagram of a process for mapping unmapped instructions.

FIG. 5 shows the detailed method steps 500 for Case I. The first case, where an edge directly connects two unmapped units, is shown in the first two stages of FIG. 4. As shown in FIG. 3b, the edges are processed according to their weights.

In step 520, a compound node E–C is formed from the two units at either end of the heaviest edge. This compound node is mapped to cache line having colors as indicated in step 530. In step 540, determine the unavailable-set of colors for E and C. The unavailable-set for E initially includes the colors blue and yellow, e.g., E(b,y) which are the colors of procedure C. Conversely, the unavailable-set for the procedure C is C(r,g) are the colors of procedure E.

The second stage in FIG. 4 processes the edge A→B. The two procedures are combined into a compound node A–B, and their unavailable-sets are shown in column 405. Note that the unavailable-set A(y) does not include colors red and green, even though there is an edge A→E in the flow graph 100, and node E is mapped to the colors red and green.

This is because the procedure's unavailable-set only includes units of instructions connected by edges that have been processed, and the edge A→E has not yet been processed. We chose this restriction since the unavailable-set of colors is used to restrict where to place procedures, and when placing a procedure, the procedure should only be restricted by the edges with the heaviest (most frequently traversed) weights.

Case II

Figure 6:
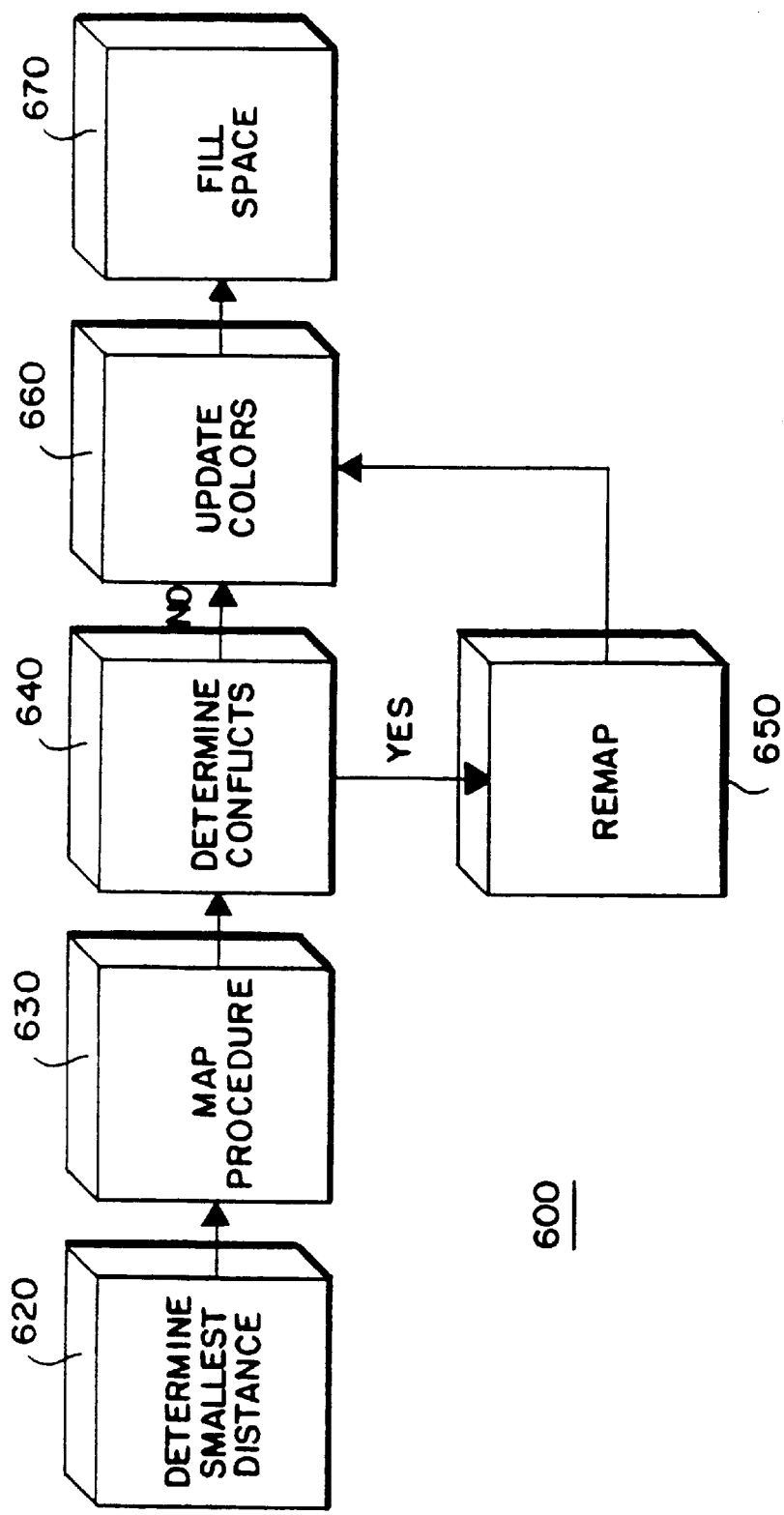
FIG. 6 is a block diagram of a process for remapping mapped instructions of different compound nodes.

FIG. 6 shows the steps 600 of case II. The second case occurs when the edge being processed connects two units in different compound nodes, e.g., the units have previously been mapped. For this case, the two compound nodes are merged. The compound node that is smaller in size, e.g., (number of procedures) is concatenated to the larger compound node. Other merging heuristics can also be used.

This is shown in stage 4 of FIG. 4 for edge B→C, which combines two compound nodes E-C, and A-B. The compound nodes both contain the same number of procedures, so we arbitrarily choose the compound node A-B to be the smaller compound node.

Our method now decides where to map, and how to order, A-B since there are four possibilities: A-B-E-C, B-A-E-C, E-C-A-B and E-C-B-A. The first decision to make is on which side of compound node E-C the compound node A-B should be placed. This is decided by determining the smallest distance between lines into which the units (nodes) are mapped in step 620. The distance is determined, for example, as the value of the heuristic:

mod(distance to instruction unit in compound node/cache size).

For our example, the distance to C is used. The distance is measured to be the distance in the number of cache line colors from the middle of procedure C to each end of the compound node. From the mapping in stage 1 of FIG. 4, this distance is 1 cache line to the right of C in the compound node E-C, and 4 cache lines to the left of C in compound node E-C.

Therefore, our method decides to place (map) A-B to the right of E-C. The heuristic "mod(distance to unit/cache size)" is used to increase the probability of being able to easily map the second compound node to non-conflicting cache colors. Note that placing compound procedure A-B to the right of compound procedure E-C produces a mapping where no cache conflicts occur, whereas if we had chosen to put A-B on the left side of E-C, then this would have caused a cache coloring conflict The next step of our method determines the order in which to place A-B, either E-C-A-B or E-C-B-A. This is decided by choosing the ordering so the two units connected by the edge being processed, i.e., B→C, are closest to each other in the memory layout. Thus we arrive at a mapping of E-C-B-A, step 630.

After this is decided, our method, in step 640, makes sure that the two nodes for the edge being processed, B and C, have no cache lines that conflict. This is done by comparing the colors used for procedure C with the colors used for procedure B. If there are no conflicts, then placement is final and the colors of the unavailable-sets are updated in step 660.

Otherwise, if there is a conflict, then the smaller compound node is shifted away (remapped) from the larger compound node until there is no longer a conflict in step 650.

The space left in the mapping will later be filled with unpopular procedures, step 670. If a conflict cannot be avoided, then the original location is used. When the final position for the smaller compound node has been determined, our method goes through each procedure and updates the colors (cache lines) used by each procedure in step 660. Notice that this changes the unavailable-set of colors: A's set of unavailable colors changes to red and B's changes to green, blue and yellow.

Case III

Figure 7:
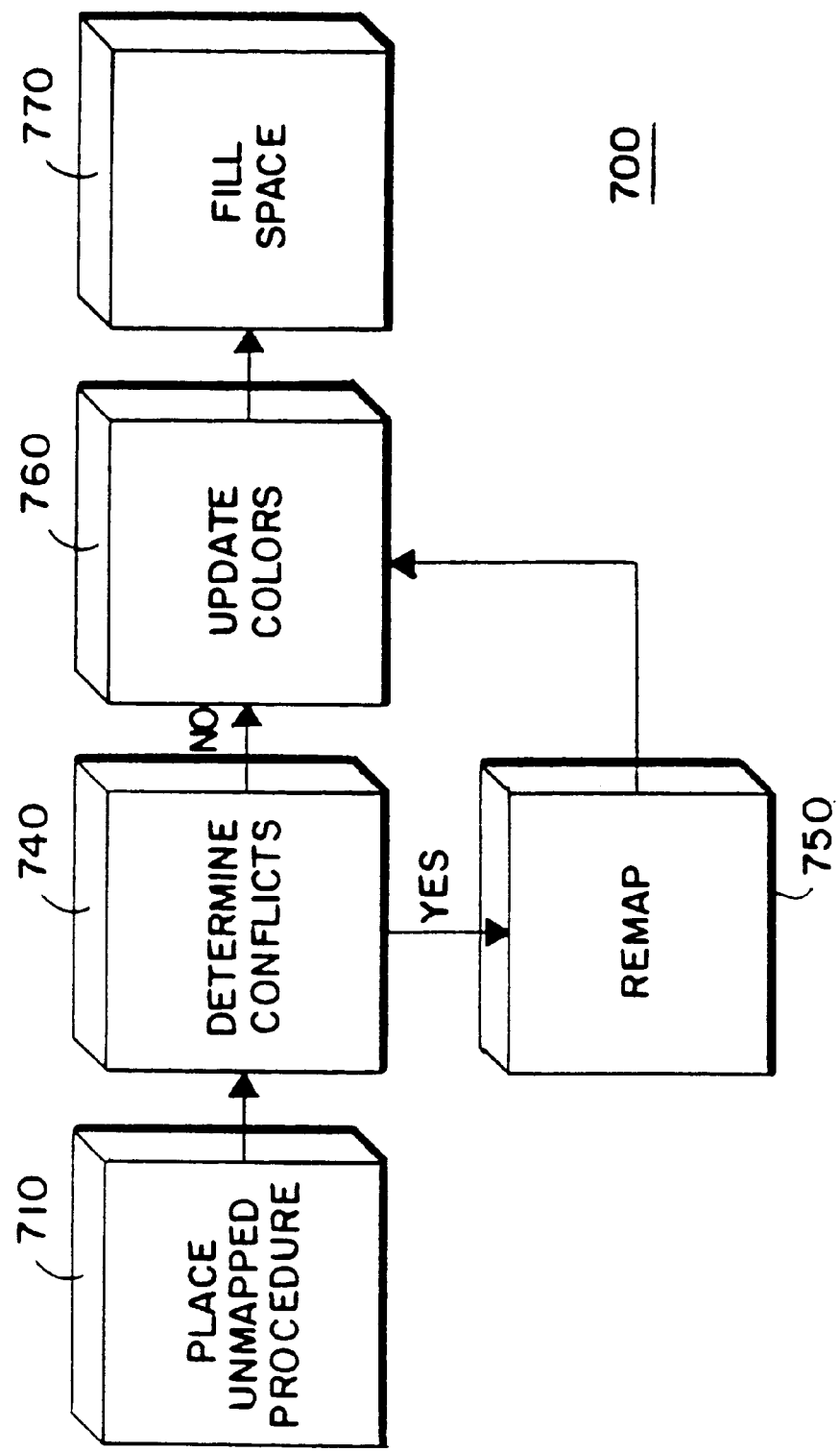
FIG. 7 is a block diagram of a process for mapping unmapped and mapped instructions.

As shown in FIG. 7 for sub-steps 700, the third type of edge connects an unmapped unit, and a previously mapped unit in a compound node. We process this case similarly to case II. In this situation, the unmapped unit is placed on either end of the compound node in step 710, which side is decided by using the smallest distance value using the heuristic "mod(distance to unit/cache size)" as described above.

Once a side is chosen, the cache line colors used by the newly mapped procedure are checked for conflict in step 740 against the colors used by its corresponding procedure in the compound node. If there is a conflict, then space is inserted in the address space between the newly mapped procedure and the compound node until the newly mapped procedure can be assigned colors which do not conflict, step 750. Space is shown as hashed lines in FIG. 3. If this is not possible, then the procedure is left at its original position, adjacent to the compound node. The colors of the unavailable-set can be updated in step 760.

Stage 4 in FIG. 4 shows this scenario. Our method next processes edge C→D, where C is contained in a compound node and D has not yet been mapped. The method first decides on which side of the compound node to place procedure D. Since both of the distances to the middle of procedure C are the same, i.e, three cache lines, the method arbitrarily chooses a side and procedure D is placed to the left of the compound node. The colors used for D at this location are blue and yellow.

However, this would create a conflict, since those colors overlap with the colors used by procedure C. Therefore, the method shifts D to the left until it finds a suitable location, if possible, where D no longer conflicts with C. This location for D is found at the colors red and green. This leaves a space in the compound node, as shown in stage 4. If a space is created inside of a compound node, then the space is filled with one or more unpopular procedures which will fit in step 770. This is also shown in stage 5 of FIG. 4, where the space created by remapping D is filled with the unpopular procedure G.

Case IV

Figure 8:
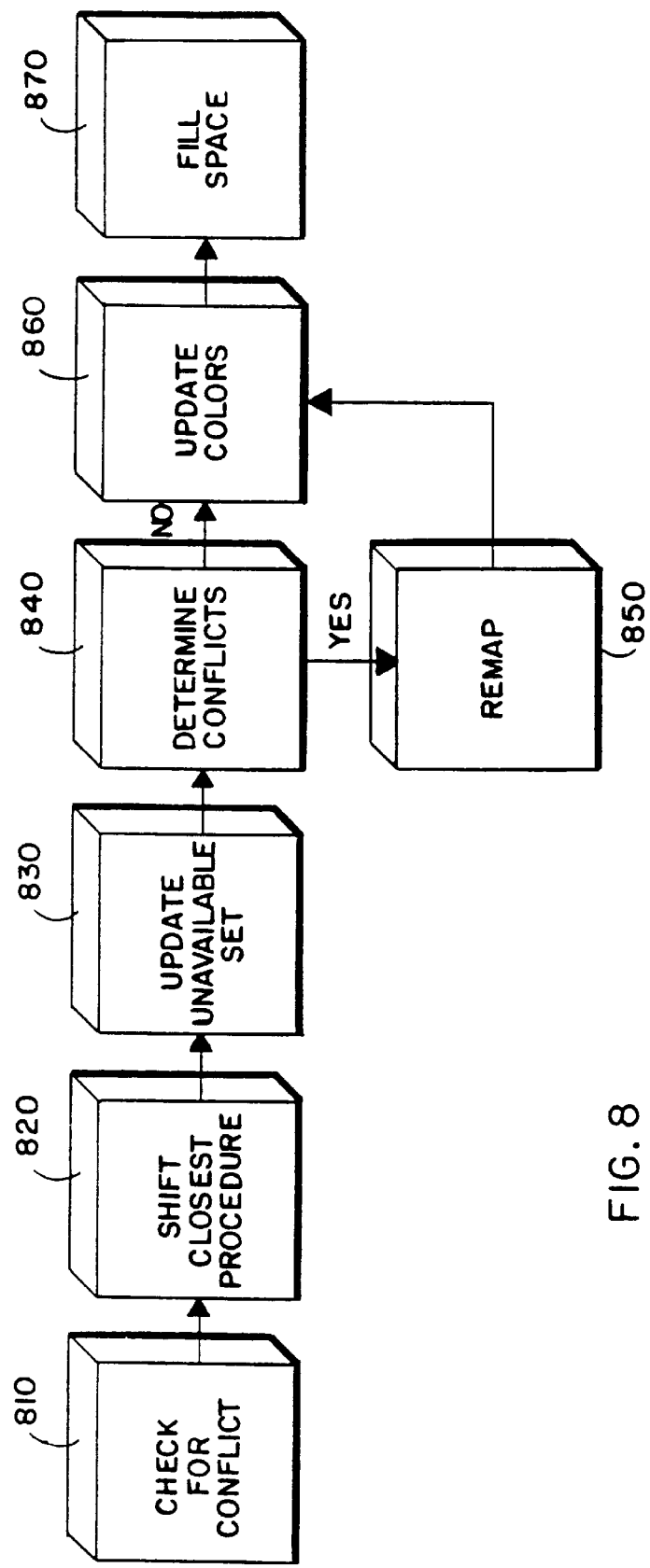
FIG. 8 is a block diagram of a process for remapping mapped instructions of the same compound nodes.

The fourth and final case is described with reference to FIG. 8. This case occurs when an edge being processed has both units belonging to the same compound node. This is a very important case since here our method uses the unavailable-sets to avoid cache conflicts.

If the colors used by the two procedures connected by the edge overlap (conflict) as checked in step 810, then the procedure closest (in terms of cache lines) to either end of the compound node is moved past the end of the compound node in step 820. This creates a space or gap in cache where the procedure used to be located. This space will later be filled by an unpopular procedure or procedures in step 870.

The unavailable-set for the procedure that is moved past the end of the colors of the compound node are updated in step 830 to include the colors of the corresponding procedure left inside the compound node. Our method then checks to see if the current colors used by the procedure conflict with any of its unavailable colors in step 840.

If there is a conflict, the procedure is shifted away from the compound node in the address space until there is no longer a conflict with its unavailable-set of colors in step 850. If we are unable to find a non-conflicting location for the procedure, the original location inside the compound node is used. Colors are updated in step 860.

This final scenario is shown in stage 6 in FIG. 4, where the edge A→E is processed, and its two procedures are in the same compound node. In examining the colors used by both A and E, we see that the two colors of the procedures conflict since they map to the same cache block (green). The method tries to eliminate this conflict by choosing to move A, since it is the closest to an end of the compound node. The method moves procedure A past the end of the compound node, mapping it to the cache line that is colored blue.

When checking A's new mapping against its unavailable-set, e.g., A(r,g), no conflicts are found. Therefore, this is an acceptable location for procedure A. Using the unavailable-set in this way guarantees that previous mapping for procedure A take precedence over the edge A→E, because those mapping were more important. Finally, since procedure A was moved in stage 6, it created a space in the compound node, as shown in FIG. 3.

If a gap is generated inside of a compound node, that empty space is filled with a unit (procedure or procedures) from the unpopular set. In our example, the remaining procedure F is used to fill the gap. We then arrive at the final mapping as shown in stage 7 of FIG. 4, which has no first-generation cache conflicts, and consequently, cache misses are minimized.

This process is repeated, until all of the edges in the popular set have been processed. Any remaining procedures in the unpopular list are mapped using a simple depth-first traversal of the unpopular edges that join these unpopular procedures. This can create several disjoint compound nodes. These nodes are then ordered in the final layout, for example, from the most frequently executed to the least frequently executed, although other heuristics can also be used.

Our method improves on the prior art reordering methods by keeping track of the colors of cache lines into which each instruction unit is mapped when performing the procedure mapping. This allows our method to effectively map instruction units, eliminating cache conflicts even when the compound node size grows larger than the instruction cache.

Additional Embodiments

In the following sections, we described how to apply our color mapping method to associative caches. In addition, we also describe how our method can benefit from basic block reordering, and procedure splitting. Furthermore, we describe how to improve the performance of our method by using more information on temporal locality to guide the mapping. The information can dynamically be collected during an execution of the program.

Color Mapping for Associative Caches

Our method can be applied to set-associative instruction caches. To accomplish this, we treat the associativity of the cache as another dimension in the mapping of the address space. For associative caches, our method breaks up the address space into chunks. Each chunk is equal in size to the number of cache sets multiplied by the size of the lines of the sets. In this case, the number of sets represents the number of available colors for our mapping.

Our color mapping method can then be applied as described above with some minor modifications. The method changes slightly to keep track of the number of times each color (associative set) appears in a unit's unavailable-set of colors, for example E(2b, 3y). Therefore, mapping a unit of instructions to a color (set) does not cause any conflicts as long as the number of times that color (set) appears in the unavailable-set of colors is less than the degree of associativity of the cache. This effectively turns the unavailable-set into a "multi-set," which allows each color to appear in the set up to a number which is equal to the associativity of the cache.

Knowledge of Cache Size

Some known mapping methods attempt to improve instruction cache performance by not caching infrequently used instructions, and by performing instruction reordering during compiler optimizations. There, the mapping method works at the basic block level, and concentrates on laying out the instructions based on loop structures in the program.

Those methods construct a control flow graph with basic block, procedure, and loop nodes. Then, those methods try to partition the graph, concentrating on the loop nodes, so that the height of each partitioned tree is less than the size of the cache. If this is the case, then all of the nodes inside the tree can be trivially mapped, since they will not interfere with each other in the cache. If this is not the case, then some nodes in the mapping might conflict with others in the cache.

The notion of making the mapped tree size smaller than the cache size can also be used by our method when we partition the flow graph into popular and unpopular instruction units and edges. Partitioning the flow graph actually splits the graph into several disjoint sub-graphs comprised of the popular units and edges. This has the effect of breaking the flow graph into smaller, and more manageable pieces. If the sum of all the unit sizes in a sub-graph is smaller than the size of the instruction cache, then there will be no conflicting colors when laying out all of the units in the sub-graph and the mapping can readily be done.

As an advantage, our method, instead of just taking into consideration the cache size, also take into consideration the exact cache lines used by each unit of mapping. This allows our method to effectively eliminate first-generation cache conflicts, even when the popular sub-graph size is larger than the instruction cache, by using the color mapping and the unavailable-set of colors.

Other known techniques describe methods for mapping execution intensive operating system programs. Those methods take into consideration the size of the cache, and the popularity of instructions. There, the operating system instructions are partitioned into executed and non-executed parts at the basic block level. Then, repeated sequences of basic blocks are generated from the executed code. All the basic blocks with weights above a threshold value are removed from the graph and put into a sequence which is a list of basic blocks. All the basic blocks in the sequence are then mapped together in the address space.

Subsequently, the threshold value is lowered, and the process is repeated until all the frequently executed basic blocks have been put into sequences. These methods take into consideration the cache size by mapping the most frequently executed sequence into a special area in the cache. The rest of the sequences are then mapped to areas in the cache, avoiding this special area. This creates gaps in the program layout which are then filled by the non-executed basic blocks.

Such methods are designed for mapping operating system instructions to increase performance, by keeping frequently executed instructions in the cache. Our method is designed for application code and tries to eliminate as many conflicts as possible. These two goals are different.

Our method uses unpopular instruction units of an application program to fill in spaces generated when mapping procedures. Our method differs in that unpopular units are used to eliminate cache conflicts by performing a color mapping that gives priority to the units that switch control flow most frequently in the flow graph. In contrast, known techniques use non-executed instructions to eliminate cache conflicts only for some of the popular basic blocks, e.g., the most frequently executed sequences of instructions.

Keeping track of the colors used by each instruction unit, and using the unavailable-set to eliminate as many conflicts as possible, makes our method more general for eliminating cache conflicts in application programs.

Techniques that recursively break up basic blocks into instructions sequences using a threshold value, may work well for operating system programs, however, those techniques may not work as well for application programs. This is due to the fact that those techniques do not take into consideration the connectivity (execution relationship) of the basic blocks in the sequence. Therefore, a sequence of instructions could potentially be laid out together in the address space, with the basic blocks having little or no temporal locality. Therefore, the basic blocks of one sequence could cause conflicting misses with basic blocks in another sequence.

For application code, our coloring method offers better performance over a recursive threshold partitioning method since we take into consideration the execution relationship or connectivity of the flow graph.

Our method can also incorporate code reordering techniques such as basic block reordering and procedure splitting. For example, our color mapping method can benefit from basic block reordering because once the basic blocks have been aligned and condensed into the first part of the procedure, the cache line colors used by the frequently executed basic blocks are the only colors that need to be considered when performing the procedure mapping.

Using basic block profiling, each procedure contains two sets of cache colors: those for the important portions of the procedure, and those for the unimportant. Then, the only basic blocks to be considered in the unavailable-set of colors are the important basic blocks.

Performing procedure splitting can also be used to improve the performance of our color mapping method. This can be achieved by performing procedure splitting to help reduce the coloring constraints between different procedures.

For example, if a first portion X1 of a procedure X calls a procedure Y, and a second portion X2 of the procedure X calls procedure Z, then finding a location for X in the color mapping as described above will have to try and avoid the colors used by both Y and Z. If procedure splitting is performed so that X is split into two separate procedures X1 and X2, then this can help reduce the coloring constraints on X.

After procedure X is split into X1 and X2, the color mapping for X1 only needs to avoid colors used by X2 and Y, and the color mapping for X2 needs to only avoid colors used by X1 and Z. This can help free up coloring constraints for very large procedures and procedures that have a significant number of different call destinations.

Using Dynamically Collected Temporal Locality Information

Our color mapping method, as described above concentrates on eliminating conflicts between edges in the control flow graph. These edges tend to be first-generation cache conflicts because the graph edges represent the edges between a unit and its direct parents and children.

However, our method can also use dynamically developed flow control information, such as profile and trace information. This information reveals temporal localities of the program during an execution. This information can be used to add extra edges between nodes, and to treat these edges as a second set of edges in our color mapping method, for example, edges 104 of FIG. 1. These additional edges 104, with the appropriate weights, can then be used in the unavailable-set of colors in order to further eliminate cache conflicts for additional generation of instruction units, e.g., other empirically determined execution relationships.

We can also use the control flow analysis of the program's structure to indicate if all the calls C→D were done during one ivocation of C, or whether they were spread out over several invocations. We can also use the control flow analysis to determine how much of procedure C can actually overlap with procedure D, so we only have to include those cache lines in the unavailable-set of procedure D. This provides more accurate temporal locality information for first-generation conflicts, However, this does not provide the additional temporal locality information needed for an in-depth analysis of the flow graph.

When profiling just the edges, there is no way to get a good indication of temporal locality for a path longer than one call edge. For example in FIG. 1, there is no way of knowing for the edge C→D how many of the calls to D came down the path through procedure B, and how many went through procedure E, nor is it possible to determine how much temporal locality there is between procedures B and D, or procedures E and D.

Some of this information can be obtained by using full path profiling, which would allow one to know the frequency of each path, although full path profiling still does not provide optimal temporal locality information. One way to obtain additional information on temporal locality is to store a full trace of a program.

Capturing, storing, and processing a full trace can be time and space consuming, but efficient techniques are known for capturing processing this information in a compact form, such as a gap model technique. This full path profiling technique can be used with our color mapping method in order to eliminate additional cache conflicts for deeper paths in the flow graph, e.g., additional generations.

The performance of the cache-based memory system is critical in today's processors. Disclosed is a method for program mapping which takes into consideration the flow graph, instruction unit size, cache size, and cache line size. Improvements are achieved by keeping track of the cache blocks colors used by each unit as the unit it is mapped in order to avoid cache conflicts. This color mapping allows our method to intelligently place unmapped instruction units, and to efficiently move a unit that has already been mapped by preserving prior color dependencies between units that have an execution relationship as indicated in the flow graph.

This provides an advantage over prior work, in that our method can accurately map units in a popular flow graph, even if the size of the graph is larger than the size of the cache. This ability is very important, especially for applications which have large and complicated control flow graphs, which result in large cache miss rates due to conflict misses, particularly if the cache is a relatively small instruction cache. Applying our method has resulted in reductions in the cache miss rate over known procedure mapping techniques.

We have concentrated on applying our color mapping method to instruction reordering. Our method can be combined with and benefit from other code reordering techniques such as basic block reordering, taking into consideration looping structures, and procedure splitting.

We have also concentrated on the performance achieved using edge profiles to guide the optimizations in order to eliminate first- generation cache conflicts. For example, our method can benefit from full path profiling, and other trace collection techniques in order to collect improved temporal locality information. We can also apply our color mapping method to statically formed flow graphs using static program estimation.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for mapping instructions of a program into a cache memory of a computer system, the cache memory being partitioned into a plurality of sections, at least two of said sections each having a respective plurality of blocks for accessing the instructions, comprising the steps of:

assigning a respective identification to each block, each of said at least two sections having an identical number of said blocks, and corresponding blocks of said at least two sections having identical respective identifications;

partitioning the program into a plurality of instruction units;

generating a flow graph for the program, the flow graph including a node for each instructions unit, and an edge connecting two nodes that have an execution relationship;

mapping instruction units of directly connected nodes into blocks of said at least two sections that have different respective identifications; and moving at least one instruction unit of a first node mapped in said cache memory to a portion of said cache memory that does not include any blocks having identifications of other blocks mapping at least one other instruction unit of a second node, said first and second nodes being directly connected.

2. The method of claim 1 further comprising:

maintaining an unavailable-set for each node, the unavailability-set of a particular node including the identifications of blocks mapping instruction units directly connected to the particular node.

3. The method of claim 1 further comprising:

assigning a weight to each edge, the weight being proportional to a relative importance of the execution relationship between the two nodes directly connected by the edge.

4. The method of claim 3 wherein each execution unit is a procedure of the program, each edge is a procedure call, and the weight is proportional to the number of times the edge is traversed during execution of the program.

5. The method of claim 3 further comprising:

mapping the instruction units in an order according to the weights of the edges.

6. The method of claim 3 further comprising:

partitioning the instruction units into popular and unpopular sets, the instruction units of the popular set directly connected by edges having weights greater than a predetermined threshold value, and mapping the instruction units of the popular set before the instruction units of the unpopular set.

7. The method of claim 1 further comprising:

selecting two instructions units which have not been mapped to the cache memory;

merging the nodes of the two selected instruction into a compound node; and mapping to two selected instruction units to adjacent blocks.

8. The method of claim 7 further comprising:

selecting instruction units of two different compound nodes;

merging the instruction units of the two different compound nodes; and determining a distance between the instructions of the two different compound nodes;

mapping the instruction units so that the distance between the instruction units of the two compound is minimized.

9. The method of claim 8 wherein each block includes a fixed number of bytes and the distance is measured as the number of bytes separating the middle of an instruction unit and the end of the merged compound nodes.

10. The method of claim 9 further comprising:

determining if there are any conflicts between the identification of the blocks into which the instruction units of the merged compound nodes are mapped;

separating the instructions units of the merged two compound nodes until there is no conflict; and mapping an instruction unit of the unpopular set into the space separating the mapped instruction units.

11. The method of claim 1 further comprising:

selecting an unmapped instruction unit and an mapped instruction units of a compound node;

merging the unmapped unit and the compound node; and determining a distance between the unmapped instruction unit and the compound node;

mapping instruction units so that the distance between the unmapped instruction unit and the compound node is minimized.

12. The method of claim 1 further comprising:

selecting mapped instruction units of the same compound node;

merging the unmapped unit and the compound node;

determining if the selected instruction units overlap in the blocks;

moving the instruction unit that is nearest to the end of the compound node until there is no conflict.

13. The method of claim 1 wherein the cache memory is a direct mapped cache, and each block is a cache line, and further comprising:

assigning a respective identification to each cache line.

14. The method of claim 1 wherein the cache memory is a set-associative cache, and further comprising:

assigning a respective identification to each set of the set-associative cache.

15. The method of claim 3 wherein each execution unit is a basic block, and further comprising:

generating an execution profile for the basic blocks; and assigning weights to the edges based on the execution profile.

* * * * *